(12) United States Patent
Imamura

(10) Patent No.: US 8,439,428 B2
(45) Date of Patent: May 14, 2013

(54) VEHICLE SIDE BODY STRUCTURE

(75) Inventor: Shogo Imamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 155 days.

(21) Appl. No.: 13/111,495

(22) Filed: May 19, 2011

(65) Prior Publication Data

US 2011/0285175 A1    Nov. 24, 2011

(30) Foreign Application Priority Data

May 20, 2010 (JP) ................................ 2010-116694
May 20, 2010 (JP) ................................ 2010-116756

(51) Int. Cl.
*B62D 25/04* (2006.01)
*B62D 25/02* (2006.01)
*B62D 21/15* (2006.01)

(52) U.S. Cl.
USPC ............ 296/193.05; 296/187.12; 296/193.06; 296/203.03; 296/209

(58) Field of Classification Search ............... 296/30, 296/187.03, 187.05, 187.12, 193.02, 193.05, 296/193.06, 203.03, 209; *B62D 25/02, 25/04*
See application file for complete search history.

(56) References Cited

U.S. PATENT DOCUMENTS

| | | | | |
|---|---|---|---|---|
| 5,641,194 A * | 6/1997 | Honma et al. | ........... | 296/203.03 |
| 7,581,782 B2 * | 9/2009 | Tomozawa | ............... | 296/187.12 |
| 7,753,437 B2 * | 7/2010 | Klimek | .................... | 296/187.08 |
| 2002/0043821 A1 * | 4/2002 | Takashina et al. | ........ | 296/203.03 |
| 2006/0158008 A1 * | 7/2006 | Nagashima | ............... | 296/203.03 |
| 2010/0207426 A1 * | 8/2010 | Tsuruta et al. | ............ | 296/187.12 |

FOREIGN PATENT DOCUMENTS

| | | |
|---|---|---|
| JP | 2000-085634 | 3/2000 |
| JP | 2003-025842 | 1/2003 |
| JP | 2004-148877 | 5/2004 |
| JP | 2007-168700 | 7/2007 |
| JP | 2007-191008 | 8/2007 |
| WO | 2009/038088 | 3/2009 |

* cited by examiner

*Primary Examiner* — Glenn Dayoan
*Assistant Examiner* — Jason S Daniels
(74) *Attorney, Agent, or Firm* — Rankin, Hill & Clark LLP

(57) ABSTRACT

An inner center pillar member has a section passed through the interior of a side sill into outer and inner spaces. An outer load transmitting member is provided within the outer space in opposed relation to the passed-through section of the inner center pillar member, and an inner load transmitting member is provided within the inner space in opposed relation to the outer load transmitting member with the passed-through section interposed therebetween. A door beam provided within a door has a rear end portion located close to the outer load transmitting member and lapped over a corner portion of a center pillar.

9 Claims, 17 Drawing Sheets

VEHICLE SIDE BODY STRUCTURE

FIELD OF THE INVENTION

The present invention relates to vehicle side body structures which, once an external impact is input to a side surface of a vehicle due to a lateral collision or the like of the vehicle, transmit the input impact from the side surface to a floor of the vehicle.

BACKGROUND OF THE INVENTION

Among the conventionally-known vehicle side body structures are ones where a side sill in the form of a rectangular cross-sectional pipe, constituting a lower frame section of a door opening, is fixedly joined with a center pillar constituting a vertical frame section between front and rear door openings of the vehicle. The side sill comprises four panels fixedly joined together along their edge portions; the four panels are, in an outer-to-inner direction of the vehicle, an outside outer panel, an inside outer panel, an inside inner panel and an insidemost inner panel located inwardly of the inside inner panel. Further, in a joint section of the structure where the center pillar is fixedly joined to the side sill, a partitioning member (bulkhead or load transmitting member) is provided in a space defined by the inside outer panel and the inside inner panel, to thereby increase a mechanical strength against a lateral collision of the vehicle. One example of such vehicle side body structures is disclosed in Japanese Patent No. 3492922 (hereinafter referred to as "relevant patent literature").

However, in the vehicle side body structure disclosed in the relevant patent literature, provision of the partitioning member (bulkhead or load transmitting member), extending all the way from the inside outer panel to the insidemost inner panel, would invite undesirable interference between the load transmitting member and the inside inner panel (and hence a passed-through section of an inner center pillar member), although a lateral collision impact (load) can be transmitted via the load transmitting member to a vehicle floor connecting to the insidemost inner panel.

Further, because the vehicle side body structure disclosed in the relevant patent literature is constructed in such a manner that, when a lateral collision impact (load) has been input to the door, the lateral collision impact is absorbed by the door and center pillar, and as a consequence, the vehicle body would be undesirably reduced in mechanical strength.

SUMMARY OF THE INVENTION

In view of the foregoing prior art problems, it is an object of the present invention to provide an improved vehicle side body structure which can efficiently transmit a lateral collision impact (load), via load transmitting members, to a vehicle floor, without the load transmitting members interfering with a passed-through section of an inner center pillar member.

It is another object of the present invention to provide an improved vehicle side body structure which can efficiently transmit a lateral collision impact (load) from a door, via load transmitting members, to a vehicle floor and thereby achieve an increased mechanical strength of the vehicle body.

In order to accomplish the above-mentioned objects, the present invention provides an improved vehicle side body structure including a side sill of a closed sectional shape constituting a lower end of a left or right side wall of a passenger compartment with a door mounted thereon, a cross member of a floor of the passenger compartment being mounted at one end portion thereof to a substantial longitudinally-middle portion of the side sill, which comprises: a center pillar extending upward from the longitudinally-middle portion of the side sill and including an inner center pillar member, the inner center pillar member having a passed-through section passed through an interior of the side sill to partition the interior into an inner space and an outer space; an outer load transmitting member (outer bulkhead) disposed within the outer space in opposed relation to the passed-through section of the inner center pillar member; and an inner load transmitting member (inner bulkhead) disposed within the inner space in opposed relation to the outer load transmitting member with the passed-through section of the inner center pillar member interposed therebetween.

According to the present invention, the outer load transmitting member is disposed within the outer space in opposed relation to the passed-through section of the inner center pillar member, while the inner load transmitting member is disposed within the inner space in opposed relation to the outer load transmitting member with the passed-through section of the inner center pillar member interposed therebetween. Thus, once a lateral collision load is input to a side surface of the vehicle, the present invention advantageously allows the input lateral collision load to be efficiently transmitted from the side surface sequentially to the center pillar, the outer load transmitting member, the passed-through section of the inner center pillar member, the inner load transmitting member and then to the cross member that constitutes a framework of the floor (under body), without the load transmitting members interfering with the passed-through section of the inner center pillar member.

Preferably, the inner load transmitting member is disposed along the end surface of the one end portion of the cross member. Thus, an input lateral collision load can be transmitted to the cross member with an even further increased efficiency.

Preferably, the outer load transmitting member is fixedly joined to an intermediate-layer member of the side sill defining the outer space in conjunction with the passed-through section of the inner center pillar member, and the inner load transmitting member is fixedly joined to an inner side sill member defining the inner space in conjunction with the passed-through section of the inner center pillar member. Thus, a load transmitting unit which comprises the outer load transmitting member and the inner load transmitting member can be provided within the side sill without interfering with the passed-through section of the inner center pillar member.

Preferably, as viewed in plan of the vehicle, the inner and outer load transmitting members each have a hat-like sectional shape and have respective openings opposed to each other, the inner and outer load transmitting members have respective body portions (i.e., inner body portion and outer body portion) extending in a width direction of the vehicle substantially perpendicularly to the passed-through section of the inner center pillar member, the respective body portions of the inner and outer load transmitting members being aligned with each other substantially linearly in the width direction of the vehicle. Thus, a body section (comprising the inner body portion and outer body portion) of the load transmitting unit can be mounted easily with an increased mounting accuracy.

Preferably, as viewed in front elevation of the vehicle, the inner load transmitting member is located higher than the outer load transmitting member in a height direction of the vehicle and is lapped over a lower portion of the center pillar extending upward above the outer load transmitting member.

Once a lateral collision impact load is input to the center pillar and a bending moment is produced in a portion of the outer load transmitting member located below the center pillar, the inner load transmitting member advantageously transmits the bending moment to the cross member as a compressive load while slightly deforming due to the bending moment.

Preferably, the inner load transmitting member includes an inner side portion facing toward the cross member, the inner side portion having upper-side and lower-side portions one of which is positioned and shaped to substantially match a sectional shape of the cross member. Also, the inner load transmitting member has the body portion extending continuously from the inner side portion at substantial right angles thereto, and the body portion of the inner load transmitting member is aligned substantially linearly with front and rear wall portions of the cross member facing forward and rearward, respectively, of the vehicle. With such an arrangement, a lateral collision load can be transmitted linearly from the body portion of the inner load transmitting member to the front and rear wall portions of the cross member via the inner side sill member, and thus, an enhanced load transmitting efficiency can be achieved.

Preferably, a door beam disposed within the door has a rear end portion located close to the outer load transmitting member. Thus, once a lateral collision load is input to the door, the present invention advantageously allows the input lateral collision load to be efficiently transmitted from the door beam to the outer load transmitting member, then to the inner load transmitting member and then to the cross member Preferably, the door beam has a bead provided thereon and extending in a longitudinal direction thereof, and, as viewed in side elevation of the vehicle, the rear end portion of the door beam is lapped over a corner portion of a channel-shaped intermediate layer member of the center pillar. Once a lateral collision load is input to the door, the input load can be transmitted and dispersed, via the bead, to the corner portion of the intermediate layer member of the center pillar. Thus, the provision of the bead can prevent the door beam from being bent due to the input lateral collision load.

Preferably, the door beam has a chamfered (i.e., corner-cut-off) portion formed in the rear end portion along the lower end edge of the door. Thus, the rear end portion of the door beam can be located closer to the outer load transmitting member.

Preferably, the outer load transmitting member and the inner load transmitting member are substantially linearly aligned in a longitudinal direction of the cross member. Thus, a lateral collision load can be transmitted linearly from the center pillar to the cross member in the longitudinal direction of the cross member.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
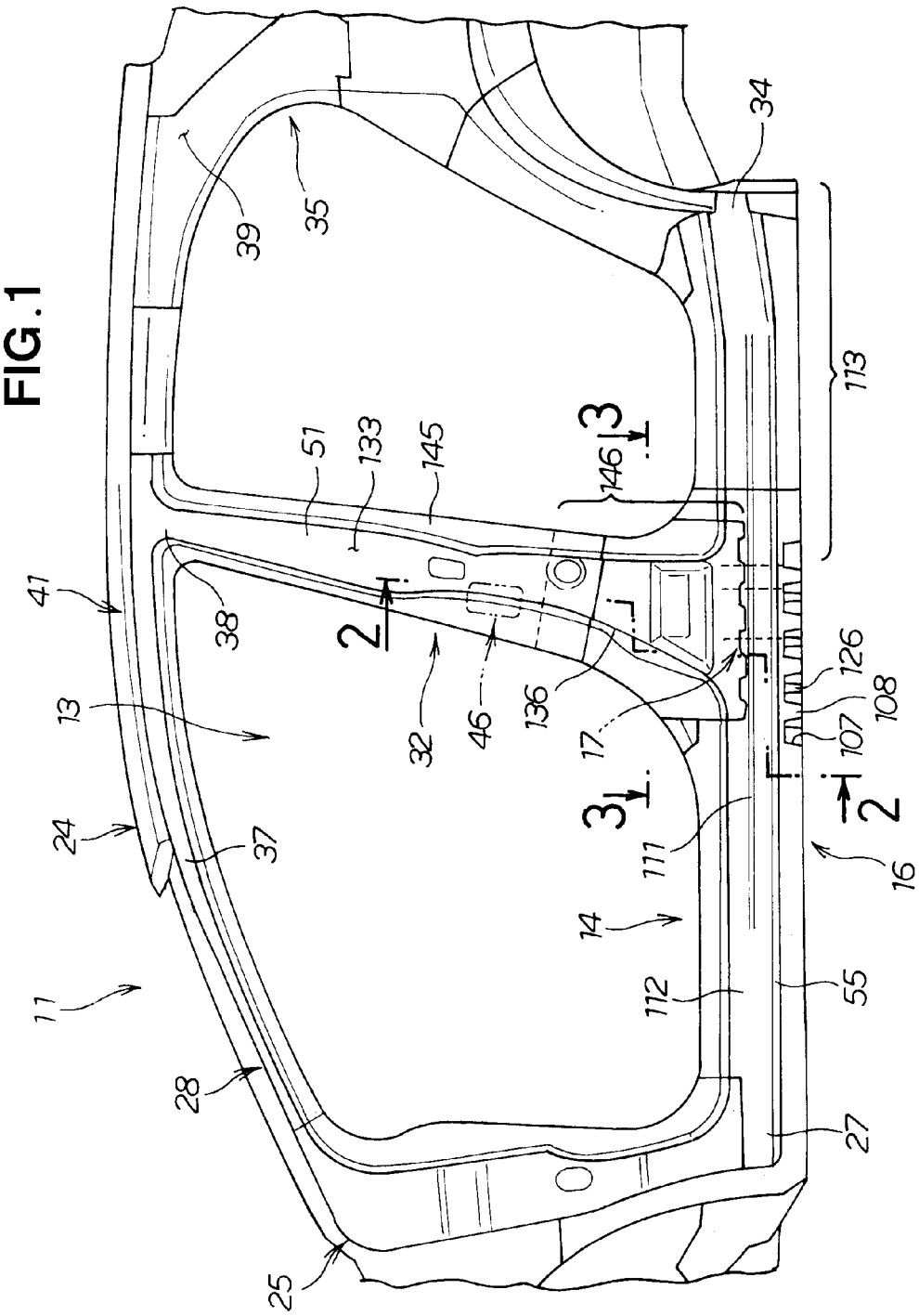
FIG. 1 is a side view showing a vehicle employing an embodiment of a vehicle side body structure of the present invention.
Figure 2:
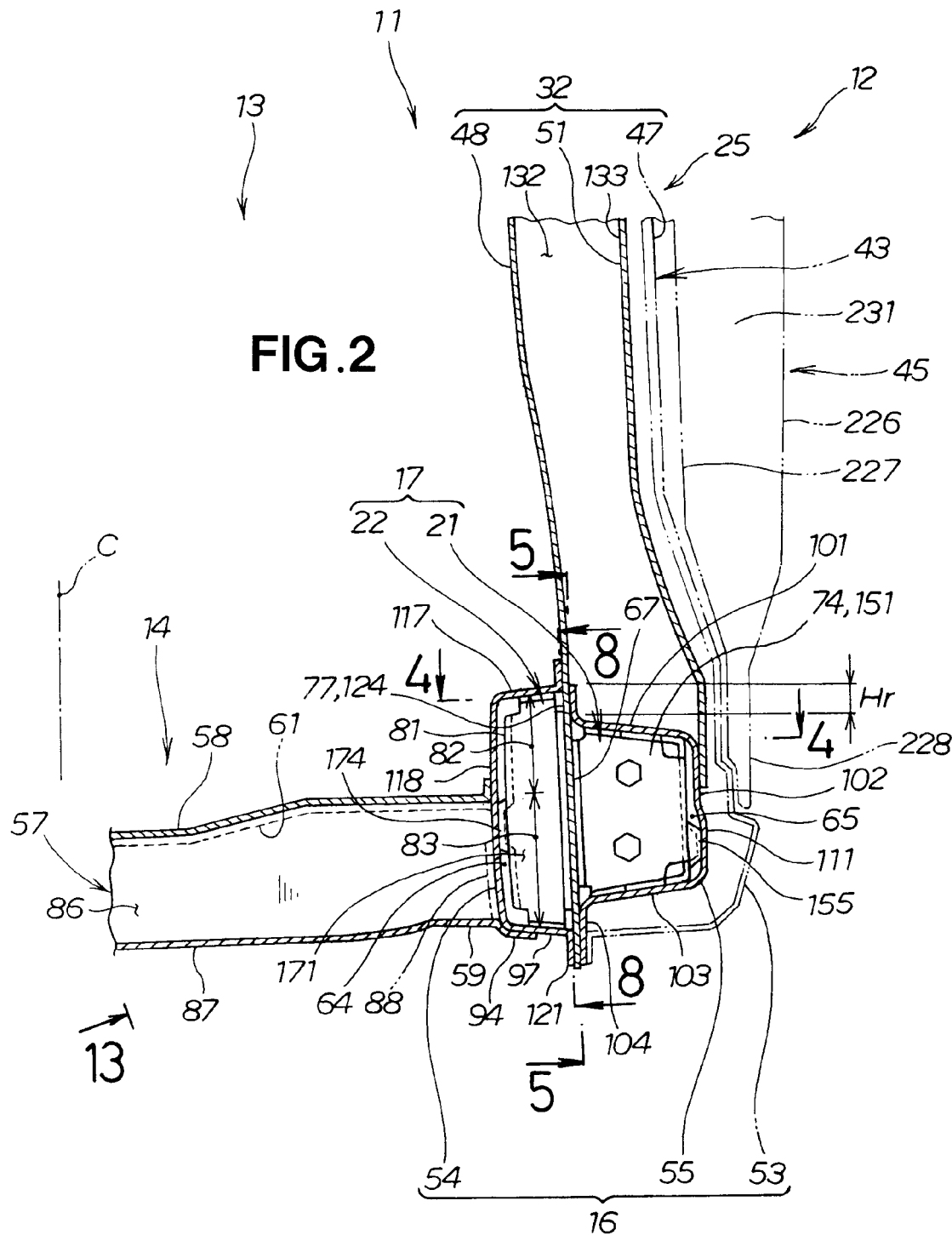
FIG. 2 is a sectional view taken along line 2-2 of FIG. 1.
Figure 3:
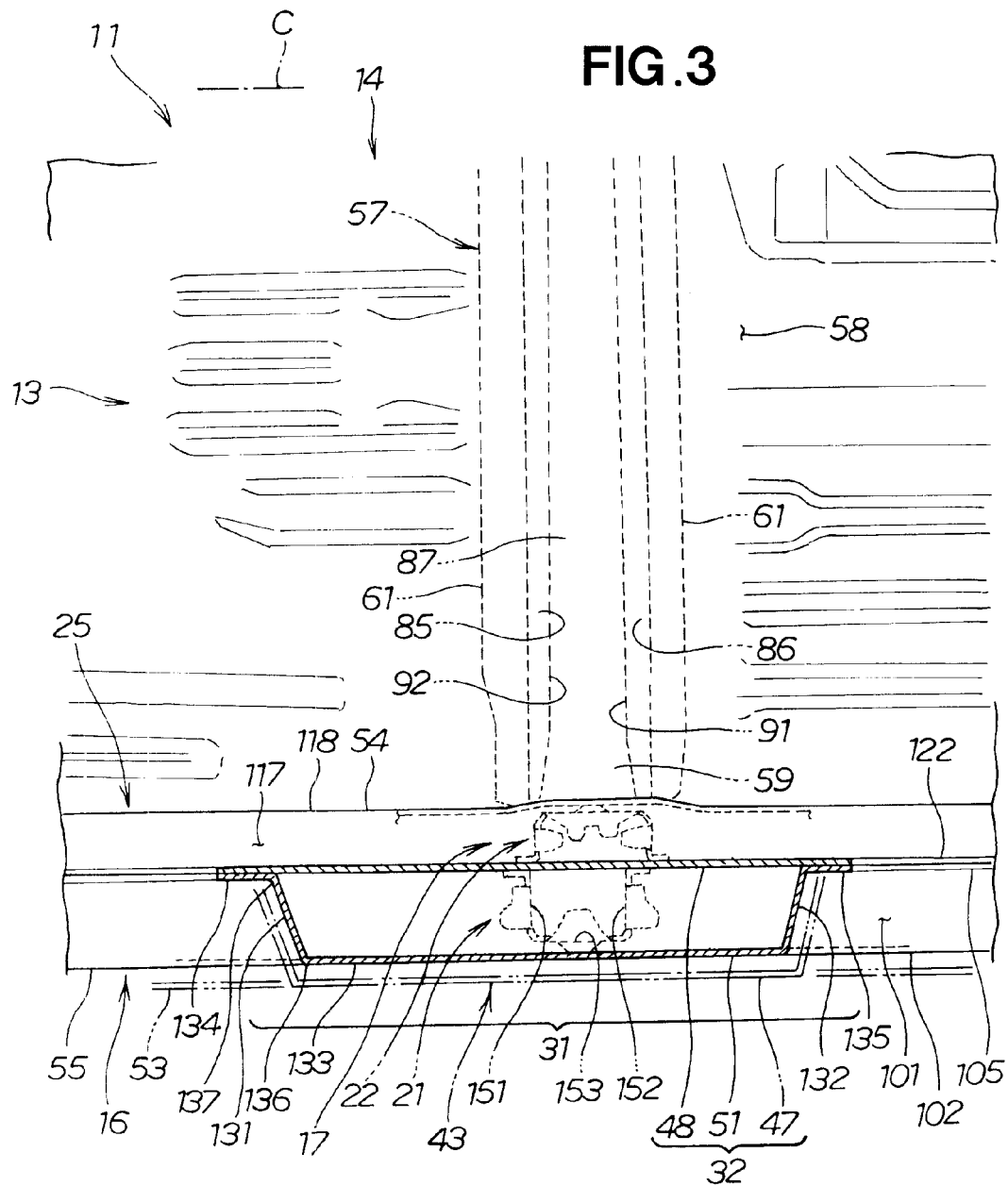
FIG. 3 is a sectional view taken along line 3-3 of FIG. 1.

Initial reference is made to FIG. 1 showing in side elevation a vehicle employing a vehicle side body structure according to an embodiment of the present invention, as well as to FIGS. 2 and 3 showing in cross-section the vehicle side body structure. Once an impact (load) is input to a side surface 12 of the vehicle 11 due to a lateral collision of the vehicle 11, the vehicle side body structure functions to absorb the input impact by transmitting the input impact to a floor (under body) 14 of a passenger compartment 13.

The vehicle side body structure includes a load transmitting member unit 17 disposed inside each of left and right side sills 16 provided on the left and right side edge of the floor (under body) 14. The load transmitting member unit 17 comprises an outer load transmitting member (outer bulkhead) 21 and an inner load transmitting member (inner bulkhead) 22 such that a lateral collision load input to the vehicle 11 is transmitted from the outer bulkhead 21 to the inner bulkhead 22.

The vehicle 11 includes a vehicle body 24. The vehicle body 24 includes the under body 14 constituting the floor of the passenger compartment 13, and left and right side bodies 25 constituting left and right side walls of the passenger compartment 13. The vehicle body 24 is constructed in substantial left-right symmetry about the centerline C (FIG. 3) extending centrally through the width of the vehicle. Although the following mainly describe the left side body 25 of the vehicle body 24, it should be noted that the right side body 25 of the vehicle body 24 is generally similar in construction and shape to the left side body 25. Particularly, the load transmitting member units 17 of the left and right side bodies 25 are constructed in left-right symmetry about the centerline C.

The side body 25 includes: the aforementioned side sill 16; a front pillar 28 fixedly joined to and extending upward from the front end 27 of the side sill 16; a center pillar 32 fixedly joined to and extending upward from a center pillar joint section 31, i.e. from a substantial longitudinally-middle portion (in the front-rear direction) of the side sill 16; a rear pillar 35 fixedly joined to and extending upward from the rear end 34 of the side sill 16; and a roof side rail 41 connected to the respective upper ends 37, 38 and 39 of the front pillar 28, center pillar 32 and rear pillar 35.

Note that the side view of FIG. 1 shows the side body 25 with an outer side panel 43 (depicted by two-dot-dash line in FIG. 2) removed for clarity of illustration. A front door 45 (FIG. 2) is mounted to the front pillar 28 and is lockable to the center pillar 32 via a lock device 46.

As shown in FIG. 2, the center pillar 32 comprises: an outer center pillar member 47 that is part of the outer side panel 43 constituting the outer surface (outer layer) of the center pillar 32; an inner center pillar member 48 disposed more inwardly of the vehicle 11 than the outer center pillar member 47 to constitute an inner layer of the center pillar 32; and a center pillar stiffener 51 disposed within a hollow interior (of a closed sectional shape), defined by the outer center pillar member 47 and inner center pillar member 48, in such a manner as to partition the hollow interior into two hollow interior regions, and constituting an intermediate layer member of the center pillar 32. The inner center pillar member 48 extends vertically through the side sill 16, as seen in FIG. 2.

As also shown in FIG. 2, the side sill 16 comprises: an outer side sill member 53 that is part of the outer side panel 43 constituting the outer surface (outer layer) of the side sill 16; an inner side sill member 54 disposed more inwardly of the vehicle 11 than the outer side sill member 53c to constitute an inner layer of the side sill 16; and a side sill stiffener 55 disposed within a hollow interior (space) (of a closed sectional shape), defined by the outer side sill member 53 and inner side sill member 54, in such a manner as to partition the hollow interior into two hollow interior regions, and constituting an intermediate layer member of the side sill 16. The under body 14 is fixedly joined to the inner side sill member 54.

As shown in FIGS. 2 and 3, the under body 14 includes a cross member 57 fixedly joined to the side sill 16, and a floor panel 58 is fixedly joined to upper edge flanges 61 of the cross member 57. More specifically, the cross member 57 is fixedly joined at its one end portion (left end portion in the illustrated example) 59 to the substantial middle portion (i.e., center pillar joint section 31) of the inner side sill member 54. Although not shown, the cross member 57 is fixedly joined at its other end portion to the substantial middle portion (i.e., center pillar joint portion 31) of the inner side sill member of the right side sill 54.

Next, with reference to FIGS. 1-15, a description will be given about principal elements of the embodiment of the vehicle side body structure. In the embodiment of the vehicle side body structure, the center pillar 32 of the side wall (side body 25) is fixedly joined to and extends upward from the substantial longitudinally-middle portion (i.e., center pillar joint section 31) of the side sill 16 of a closed sectional shape that constitutes the lower end of the side wall (side body 25) (left side body 25 in this case) of the passenger compartment 13 to which is mounted the door (front door 45), and also, the one end portion (left end portion in the illustrated example) 59 of the cross member 57 of the floor or under body 14 of the passenger compartment 13 is fixedly joined to the substantial longitudinally-middle portion (i.e., center pillar joint section 31) of the side sill 16.

Figure 4:
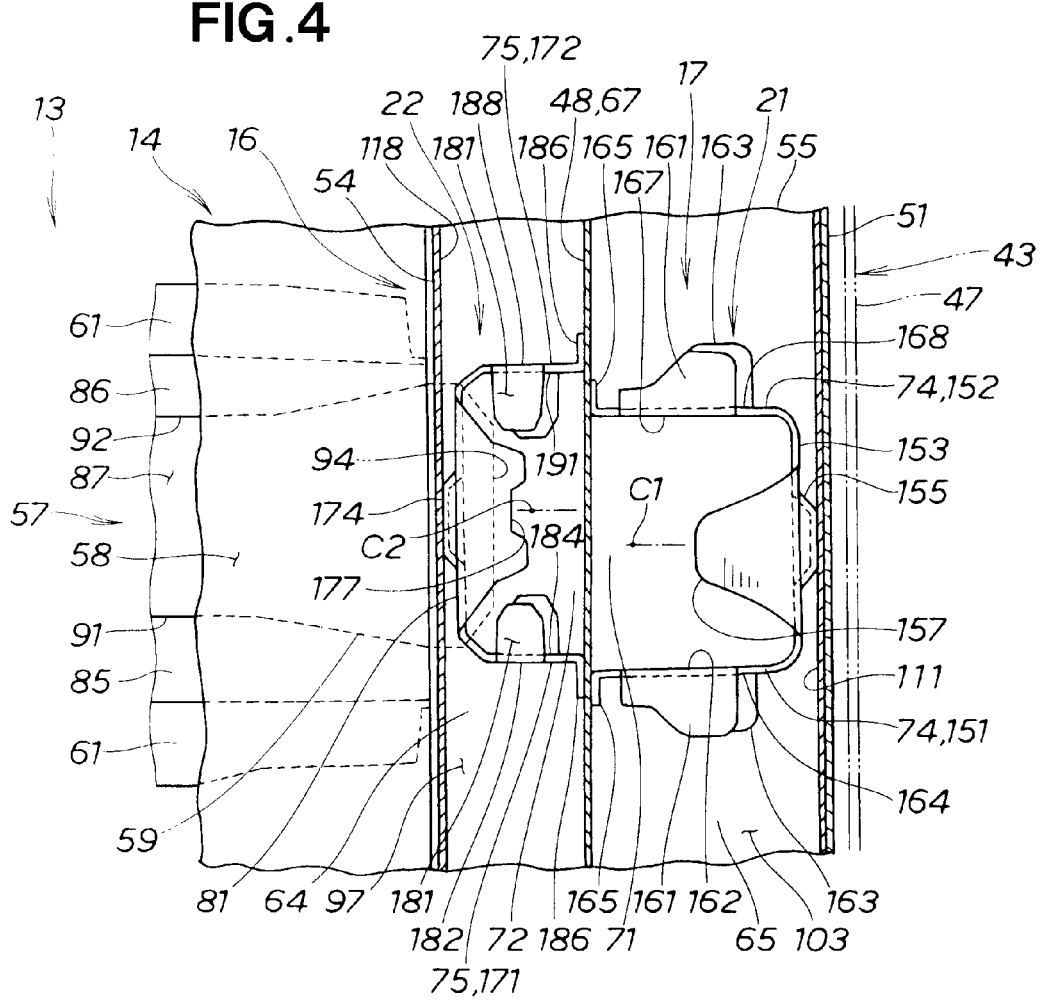
FIG. 4 is a sectional view taken along line 4-4 of FIG. 2.
Figure 11:
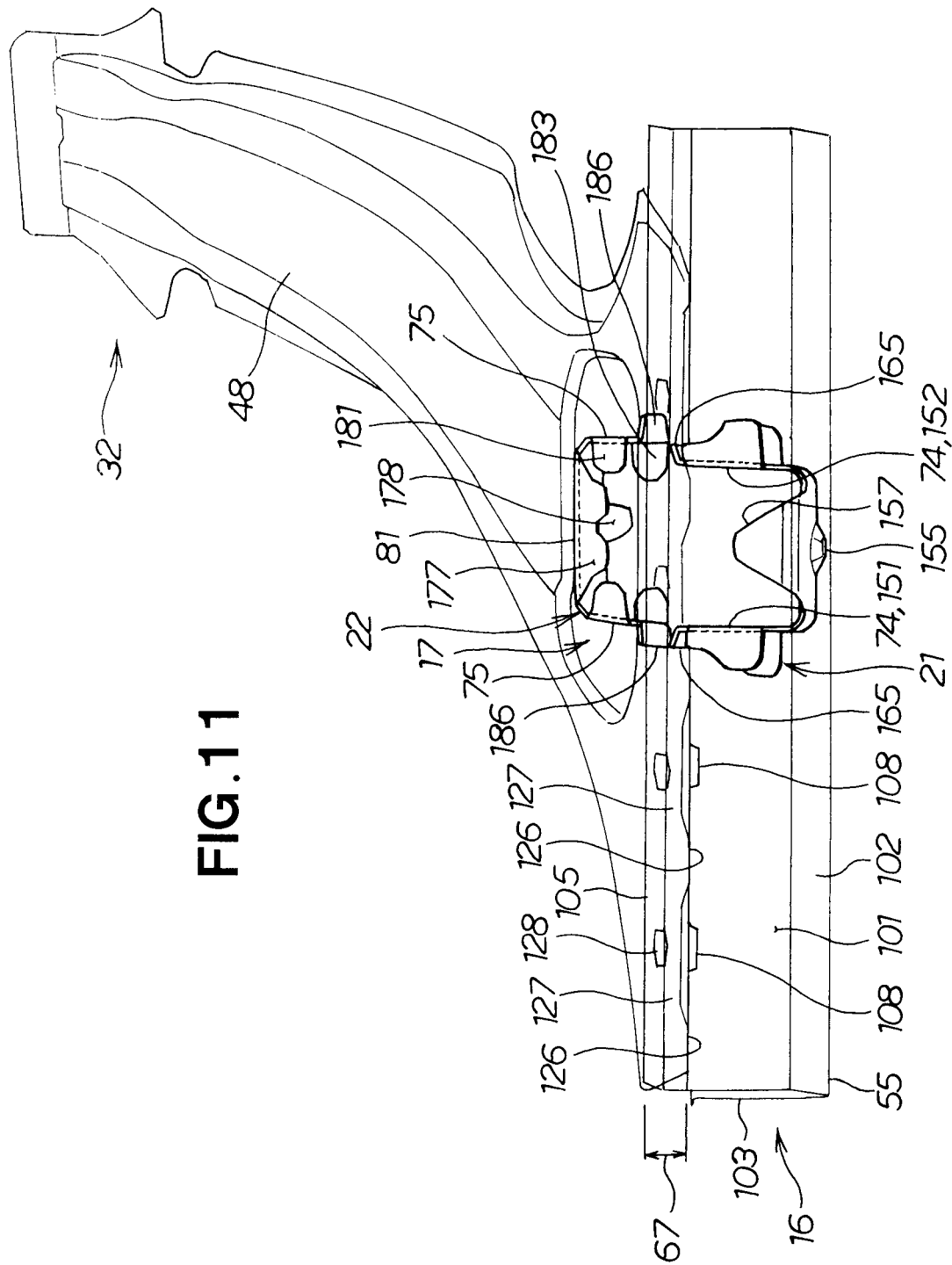
FIG. 11 is a partly-see-through perspective view of a side sill and an inner center pillar member as viewed from outside the vehicle, which particularly shows the load transmitting members.

Further, in the vehicle side body structure, as shown in FIGS. 2 to 4, a passed-through section 67 provided integrally on the inner center pillar member 48 is passed through the hollow interior of the side sill 16 to partition the hollow interior into an inner space 64 and an external space 65. The outer load transmitting member (outer bulkhead) 21 is disposed within the external space 65 in opposed relation to the inner center pillar's passed-through section 67, and the outer load transmitting member (outer bulkhead) 21 is disposed within the inner space 64 in opposed relation to the outer load transmitting member (outer bulkhead) 21 with the inner center pillar's passed-through section 67 interposed therebetween, as also seen in FIGS. 4 and 11.

As will be later described in detail, the inner load transmitting member (inner bulkhead) 22 is disposed along the end surface of the one end portion 59 of the cross member 57.

As shown in FIGS. 2 to 7, the outer load transmitting member (outer bulkhead) 21 is fixedly joined to the side sill stiffener (side sill's intermediate-layer member) 55 defining the outer space 65 in conjunction with the passed-through section 67. As shown in FIGS. 2, 4 and 8 to 10, the inner load transmitting member (inner bulkhead) 22 is fixedly joined to the inner side sill member 54 defining the inner space 64 in conjunction with the passed-through section 67.

As viewed in plan of the vehicle 11 (e.g., FIG. 4), the inner and outer load transmitting members (inner and outer bulkheads) 22 and 21 are each of a hat-like sectional shape, and they have their respective openings 71 and 72 opposed to each other. Further, the outer bulkhead 21 and the inner bulkhead 22 are positioned in such a manner that their respective body portions (i.e., outer and inner body portions) 74 and 75 extend substantially perpendicularly to the inner center pillar's passed-through section 67 and are substantially linearly aligned with each other in the width direction of the vehicle 11a. Here, "substantially" means "within a range between upper and lower limits of tolerances". Particularly, "substantially perpendicularly" means that the outer body portion 74 and the inner body portion 75 are within an angular range of 85 to 95 degrees relative to the inner center pillar's passed-through section 67, and "substantially linearly aligned" means that the inner body portion 75 extends on an imaginary extension of the outer body portion 74 in close relation to the latter.

As viewed in front elevation of the vehicle 11 (e.g., FIG. 2), an upper end portion of the inner load transmitting member (inner bulkhead) 22 is located higher than an upper end portion of the outer load transmitting member (outer bulkhead) 21 by a distance Hr in the height direction and is lapped over a lower portion 77 of the center pillar 32, over a vertical length equal to the distance Hr, extending upward above the outer load transmitting member (outer bulkhead) 21.

Further, a lower end portion of the inner load transmitting member (inner bulkhead) 22 is located lower than a lower end portion of the outer load transmitting member (outer bulkhead) 21 by a distance substantially equal to the distance Hr. In other words, the inner bulkhead 22 has a greater dimension, in the height direction of the vehicle, than the outer bulkhead 21.

Figure 8:
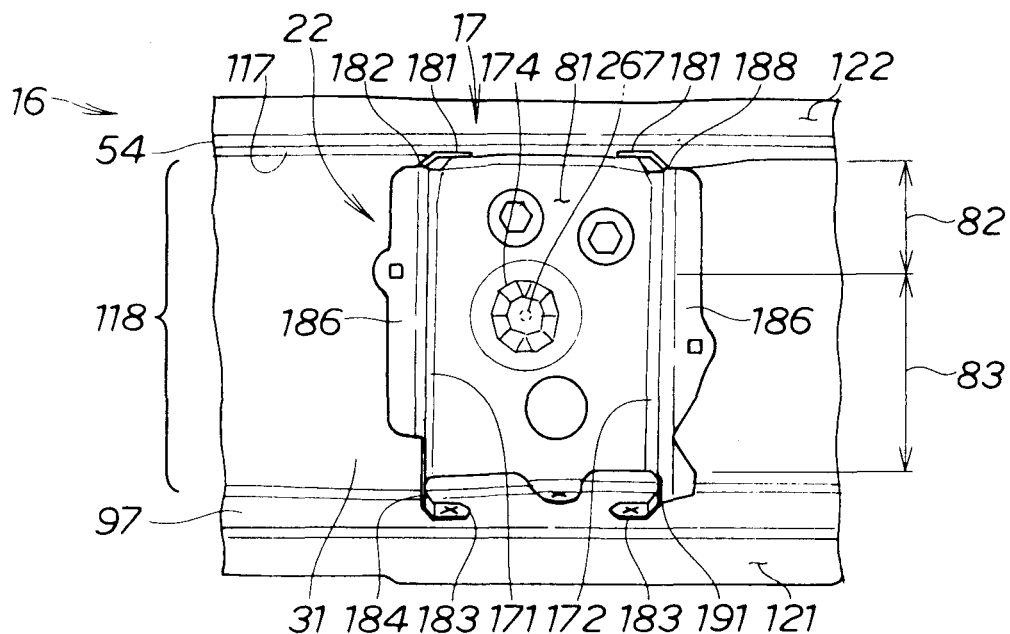
FIG. 8 is a sectional view taken along line 8-8 of FIG. 2.
Figure 12:
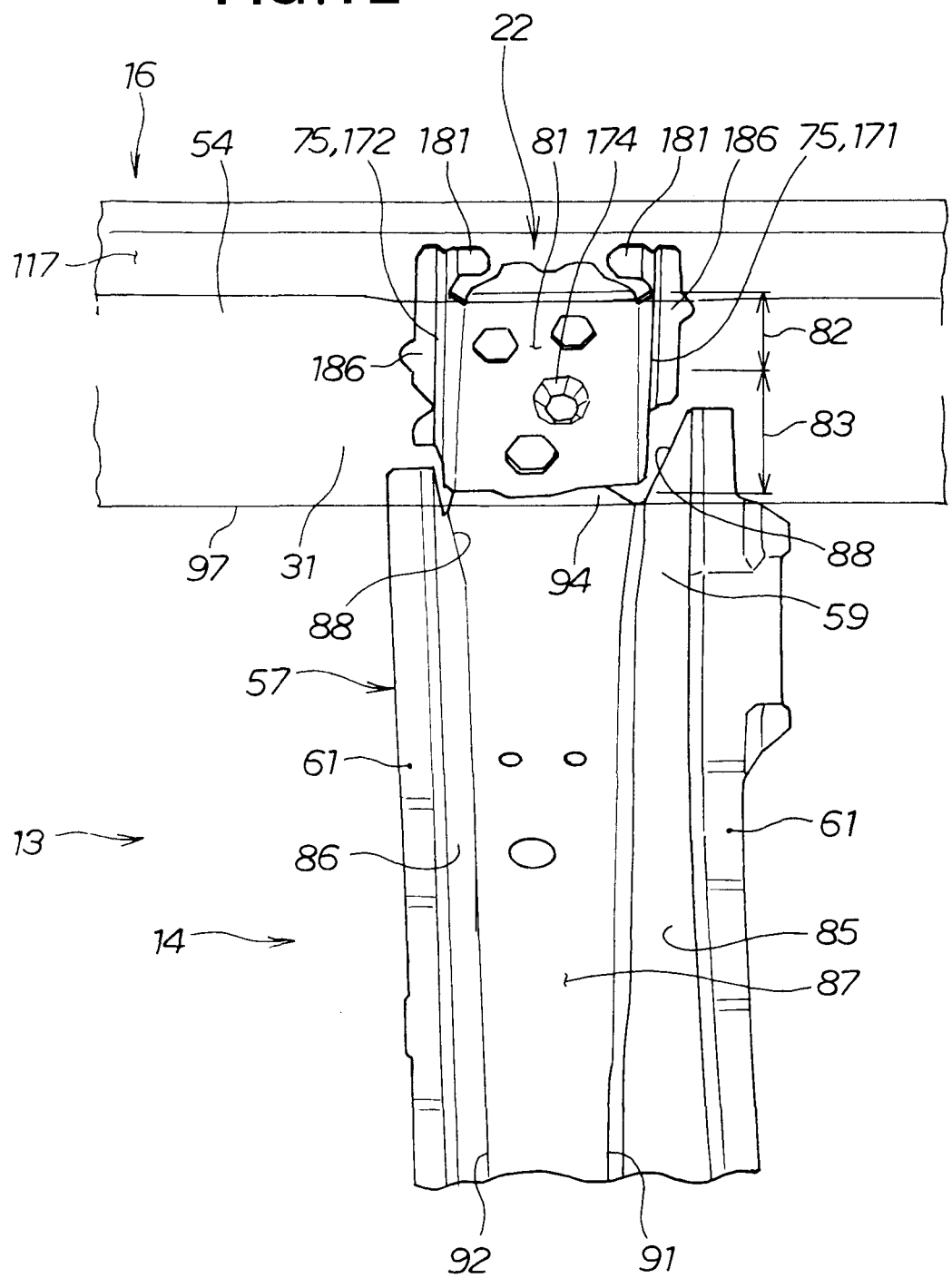
FIG. 12 is a partly-see-through perspective view of the side sill as viewed from outside the vehicle, which particularly shows the inner load transmitting member.

Further, as shown in FIGS. 2, 8 and 12, the inner load transmitting member (inner bulkhead) 22 includes a plate-shaped inner side portion 81 facing toward the cross member 57, and the inner side portion 81 has upper-side and lower-side portions 82 and 83 one of which has a sectional shape substantially matching a sectional shape of the cross member 57 as seen in FIG. 12. As also shown in FIG. 4, the inner body portion 75 extending integrally from the inner side portion 81 at substantial right angles thereto is aligned substantially linearly with front and rear wall portions 85 and 86. In the illustrated example, the lower-side portion 83 is shaped to substantially match the sectional shape of the cross member 57.

Figure 13:
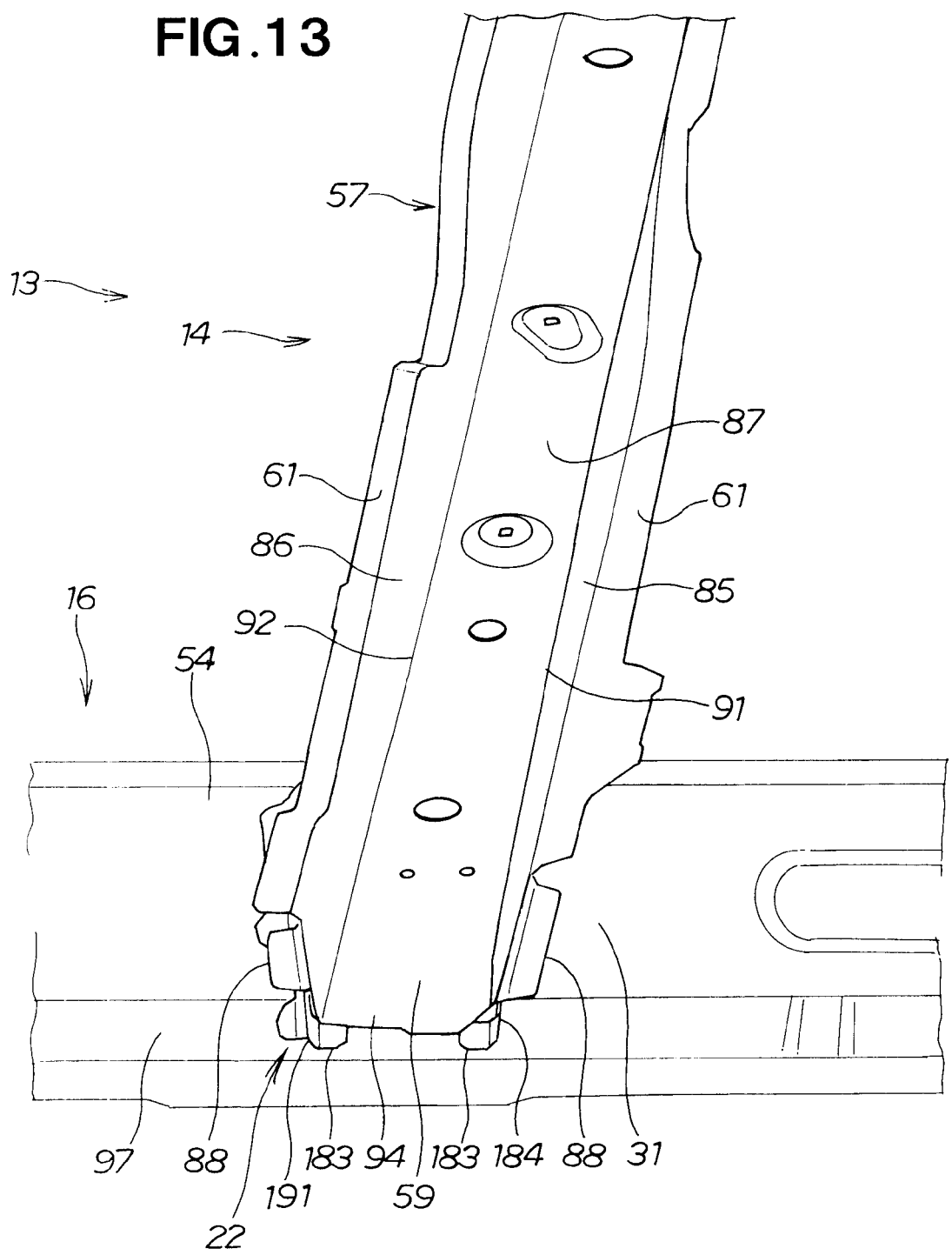
FIG. 13 is a view taken in a direction of arrow 13 of FIG. 2.

The following describe more details of the embodiment of the vehicle side body structure. As shown in FIGS. 4, 12 and 13, the cross member 57 has a U sectional shape defined by the aforementioned front wall portion 85 and rear wall portion 86 and a bottom portion 87 integrally formed with the front wall portion 85 and rear wall portion 86. Further, the upper edge flange 61 are formed integrally with the upper edge of the front wall portion 85 formed integrally with the upper edge of the rear wall portion 86. In this manner, the cross member 57 has a hat-like sectional shape.

The floor panel 58 is fixedly joined at its underside to the upper end flanges 61. Thus, the cross member 57 is fixedly joined with the underside of the floor panel 58, so that it defines, in conjunction with the floor panel 58, a closed sectional shape with a hollow interior.

Furthermore, in the cross member 57, a left end flange 88 is formed integrally with the one end portion 59 of the front wall portion 85; although not shown, a right end flange 88 is formed integrally with the other end portion 59 of the rear wall portion 85. These end flanges 88 are each fixedly joined to the corresponding inner side sill member 54.

In the cross member 57, a corner defined by the front wall portion 85 and the bottom portion 87 constitutes a front ridgeline portion 91, while a corner defined by the rear wall portion 86 and the bottom portion 87 constitutes a rear ridgeline portion 92.

As shown in FIGS. 2, 12 and 13, the bottom portion 87 of the cross member 57, more specifically a bottom flange 94 of the cross member 57, is lapped over and fixedly joined to a bottom portion 97 of the inner side sill member 54 in such a manner that the bottom flange 94 extends inwardly from the bottom portion 97.

Figure 15:
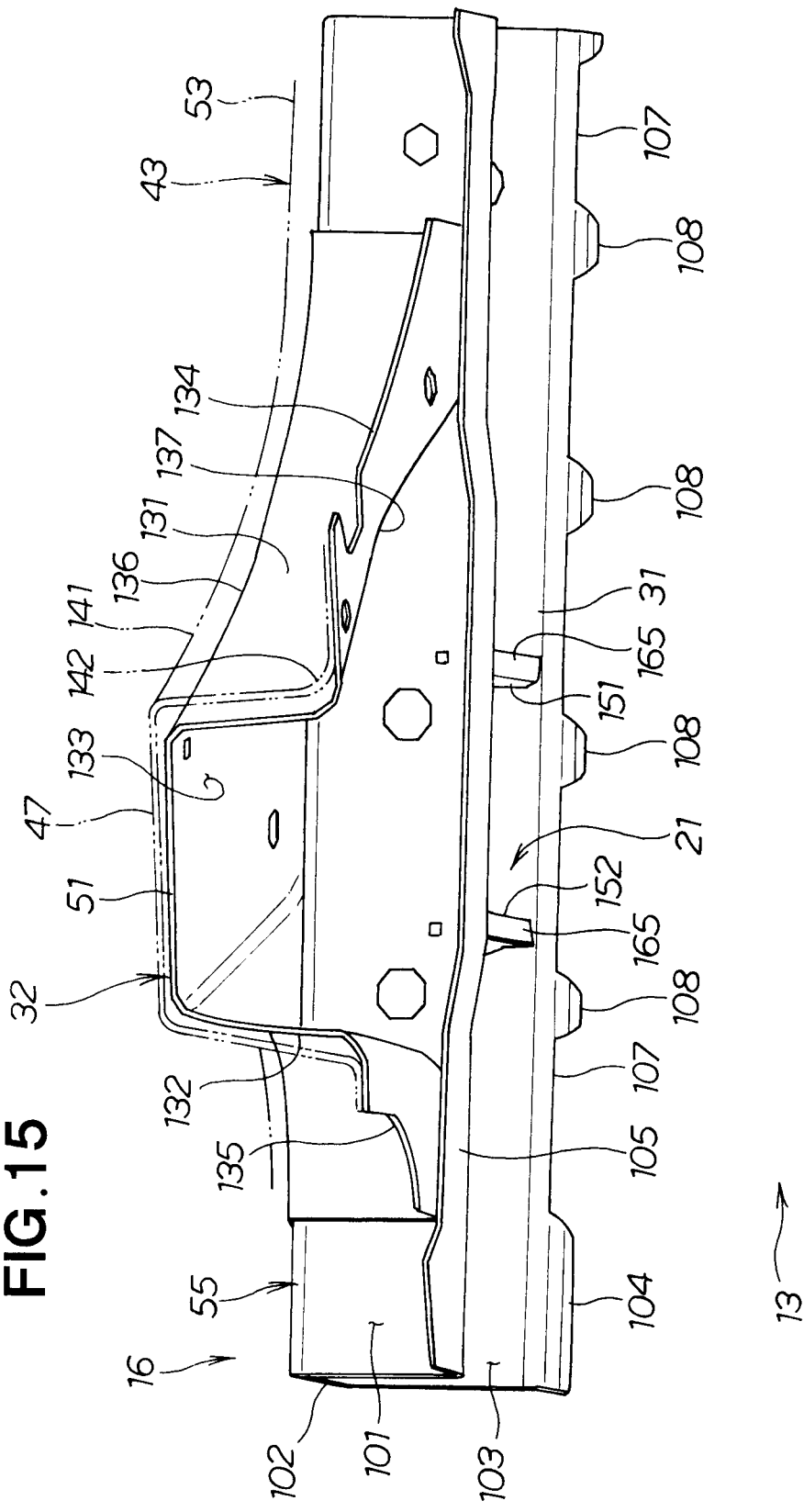
FIG. 15 is perspective view of a lower portion of a center pillar stiffener and a side sill stiffener.

As shown in FIGS. 2 and 15, the side sill stiffener (side sill's intermediate-layer member) 55, which has a hat-like sectional shape, integrally includes a ceiling portion 101, a side wall portion 102, a bottom portion 103, a lower flange 104 extending continuously from the bottom portion 103, and an upper flange 105 extending continuously from the ceiling portion 101.

In the center pillar joint section 31 of the side sill 16, the lower flange 104 of the side sill stiffener 55 has a plurality of recessed portions 107 such that a plurality of welding flanges 108 are formed at substantially equal intervals or pitches, as seen from FIGS. 1 and 5-7.

Figure 5:
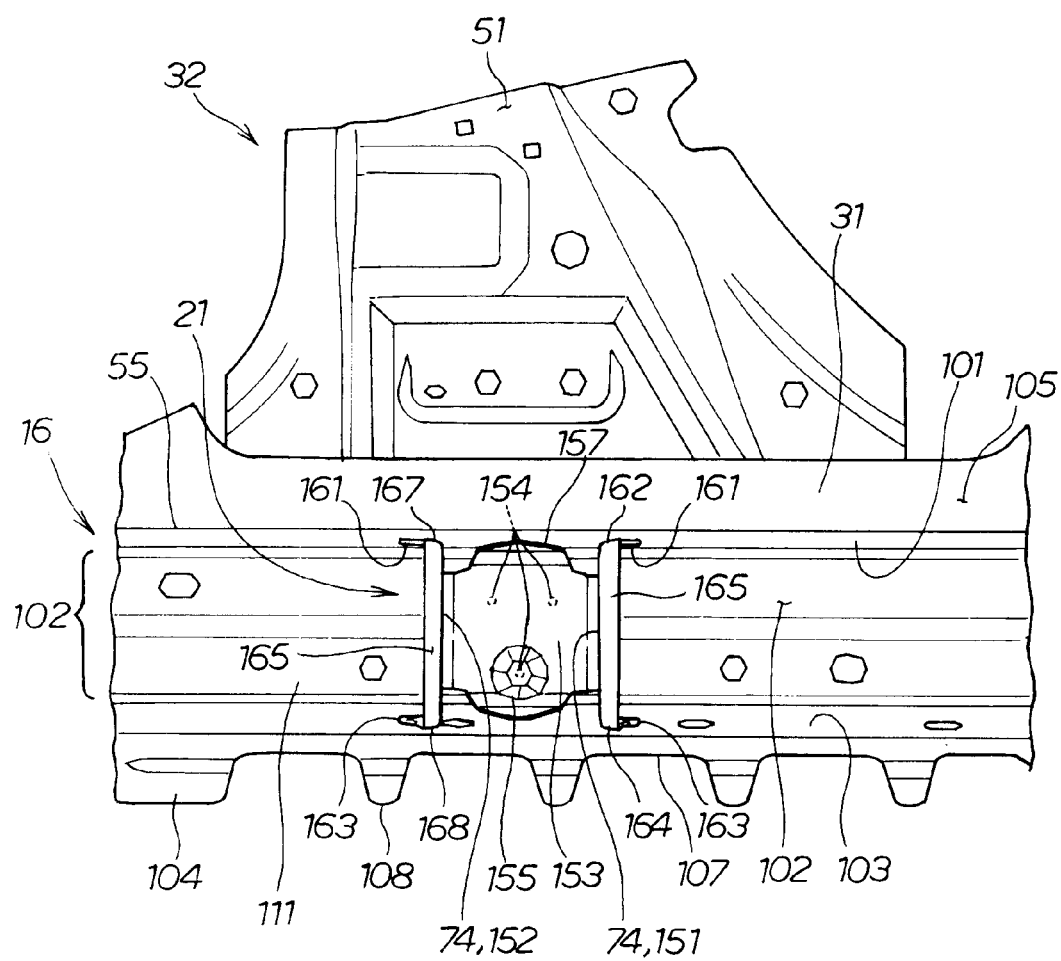
FIG. 5 is a sectional view taken along line 5-5 of FIG. 2.

A lower bead portion 111 is formed on the side wall portion 102 of the side sill stiffener 55, as seen in FIGS. 2 and 5. More specifically, the lower bead portion 111 is formed by protruding, in an outward direction of the vehicle 11, a part of the side wall portion 102, from a substantial vertically-middle region (i.e., middle region in the vehicle height direction) to a corner defined between the side wall portion 102 and the bottom portion 103. The lower bead portion 111 has a length extending from a position between the front end 27 of the side sill 16 and the center pillar 32 to a position between the center pillar 32 to the rear end 34 of the side sill 16.

As shown in FIG. 1, the side sill stiffener 55 comprises two portions, i.e. a body portion 112 and a rear portion 113 integrally formed with the body portion 112. The body portion 112 has a greater strength than the rear portion 113.

As shown in FIGS. 3 and 8, the inner side sill member 54 of FIG. 2, which has a hat-like sectional shape, integrally includes a ceiling portion 117, a side wall portion 118, a bottom portion 97, a lower flange 121 extending continuously from the bottom portion 97, and an upper flange 122 extending continuously from the ceiling portion 117.

The lower flange 121 of the inner side sill member 54 is fixedly joined, by spot welding, to the welding flanges 108 formed on the lower flange 104 of the side sill stiffener 55 in the center pillar joint section 31.

Figure 14:
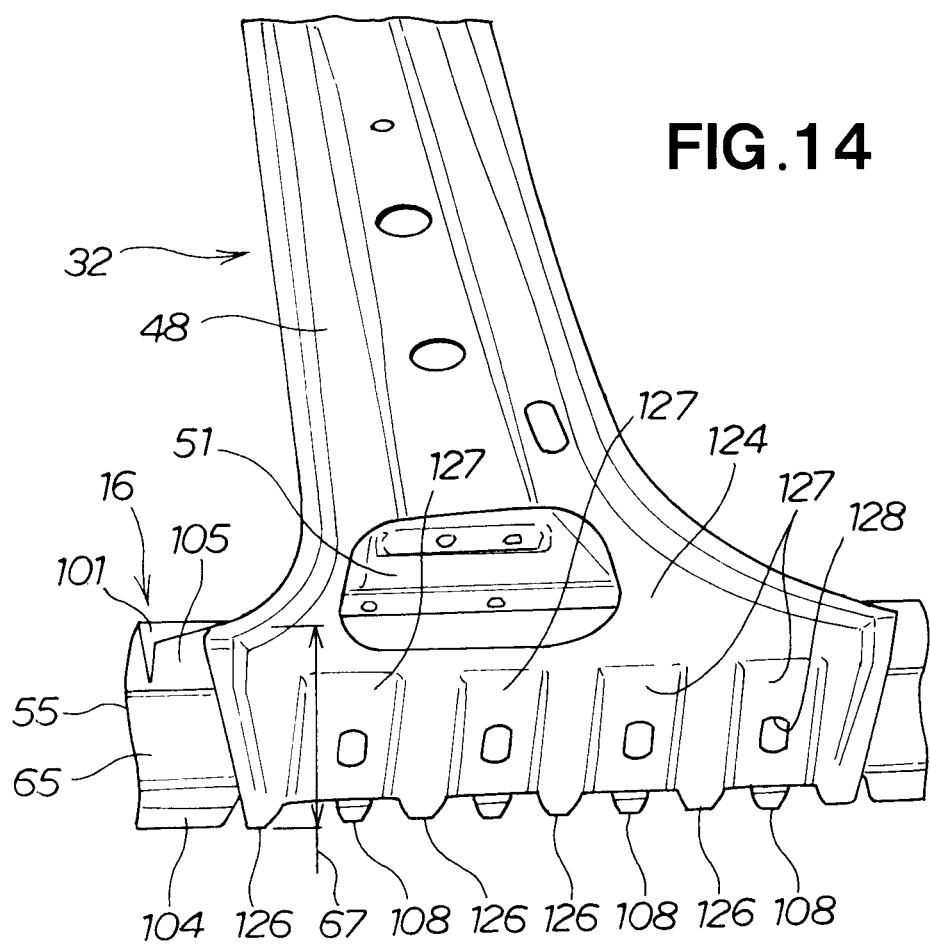
FIG. 14 is perspective view of a passed-through section of the inner center pillar member.

As shown in FIGS. 2 and 14, the inner center pillar's passed-through section 67, provided by an extension of the lower end 124 of the inner center pillar member 48 is disposed to partition or divide the hollow region, defined the side sill stiffener 55 being fixedly joined to the inner side sill member 54, into two hollow regions.

The "lower end 124 of the inner center pillar member 48" is where the inner center pillar member 48 is fixedly joined to the ceiling portion 101 and ceiling portion 117 of the side sill 16.

The passed-through section 67 of the inner center pillar 48, as shown in FIG. 14, has the same width or dimension, in the front-rear direction, as the lower end 124 of the inner center pillar 48. The inner center pillar's passed-through section 67 has a plurality of welding flanges 126 formed on its lower edge at substantially equal pitches.

Further, the inner center pillar's passed-through section 67 has a plurality of holes 128 formed through individual recessed portions 127 between the welding flanges 126, in order to reduce the weight of the inner center pillar 48, and these holes 128 are each located at a middle position, in the vehicle height direction, of the corresponding recessed portion 127. Note that the welding flanges 126 have been spot-welded to the lower flange 121 of the inner side sill member 54 in advance prior to an assembly step of the vehicle side body structure.

As shown in FIG. 11, the welding flanges 126 of the inner center pillar 48 are held in contact with the side sill stiffener 55, but the recessed portions 127 between the welding flanges 126 are held out of contact with the side sill stiffener 55 to thereby define gaps in conjunction with the side sill stiffener 55. Thus, undesired liquid can be discharged with ease through the gaps between the recessed portions 127 and the side sill stiffener 55.

As shown in FIGS. 3 and 15, the center pillar stiffener 51, which has a hat-like sectional shape, integrally includes a front side portion 131, a rear side portion 132, a side portion 133 extending continuously from the front side portion 131 and rear side portion 132, a flange 134 extending continuously from the front side portion 131, and a flange 135 extending continuously from the rear side portion 132.

A corner defined by the front side portion 131 and the side portion 133 constitutes a first center pillar stiffener ridgeline portion 136, and a corner defined by the front side portion 131 and the flange 134 constitutes a second center pillar stiffener ridgeline portion 137.

The outer center pillar member 47 of the outer side panel 43 also has first and second outer center pillar ridgeline portions 141 and 142 extending along the first and second center pillar stiffener ridgeline portions 136 and 137.

As shown in FIG. 1, the center pillar stiffener 51 comprises two portions, i.e. a body portion 145 and a lower portion 146, and the lower portion 146 has a greater strength than the body portion 145.

The following describe in more detail the outer load transmitting member (outer bulkhead) 21, with reference to FIGS. 2 to 7. The outer load transmitting member (outer bulkhead) 21 has a substantially U sectional shape, and the outer body portion 74 of the outer bulkhead 21 includes an outer front partition portion 151, an outer rear partition portion 152 and an outer side portion 153.

As viewed in front elevation the vehicle 11 (e.g., FIG. 2), the outer front partition portion 151 and outer rear partition portion 152 are each formed in a substantially rectangular shape that substantially matches a sectional shape of the side sill stiffener 55. Further, the outer side portion 153 integrally formed with the outer front partition portion 151 and outer rear partition portion 152 extends along the side wall portion 102 of the side sill stiffener 55.

Note that the outer front partition portion 151 and the outer rear partition portion 152 are symmetrical with each other about the centerline C1 of the outer load transmitting member (outer bulkhead) 21.

As viewed in side elevation of the vehicle 11 (e.g., FIG. 5), the outer side portion 153 has a substantially rectangular shape and is fixedly joined to the side wall portion 102 of the side sill stiffener 55 via spot welding portions 154. The outer side portion 153 has an outer boss portion 155 formed thereon to contact the lower bead portion 111 of the side wall portion 102, and the outer boss portion 155 is fixedly joined to the bead portion 111 via the spot welding portions 154.

Figure 6:
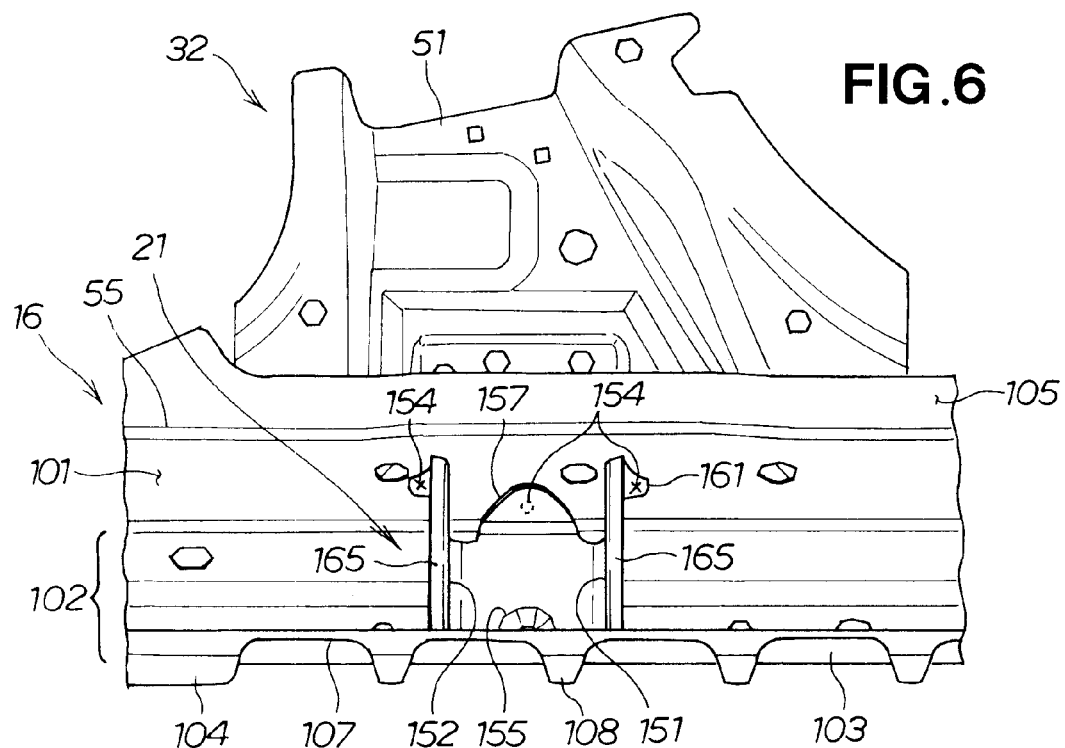
FIG. 6 is a lower perspective view of the vehicle side body structure, which particularly shows an outer load transmitting member provided in the vehicle side body structure.

Further, as shown in FIG. 6, the outer side portion 153 has an outer upper joining tab 157 formed integrally with the upper edge of the outer side portion 153 for contacting the bottom portion 103, and this outer upper joining tab 157 is welded to the ceiling portion 101 of the side sill stiffener 55 via a spot welding portion 154.

Figure 7:
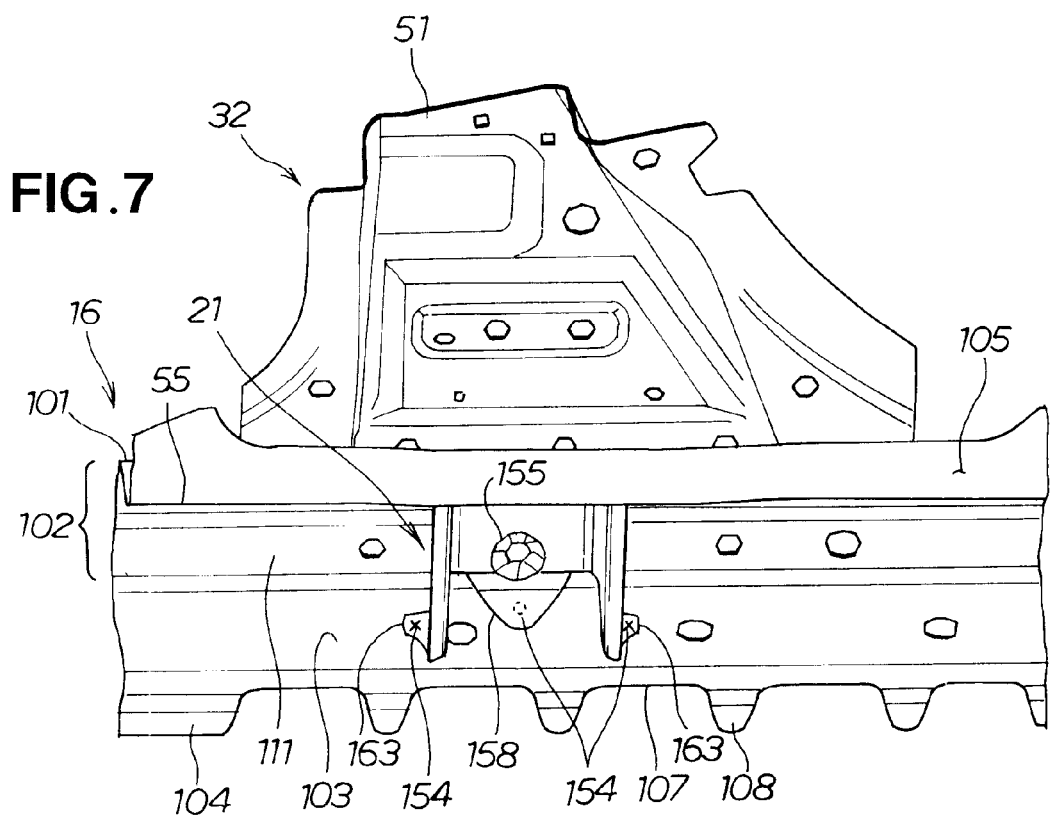
FIG. 7 is an upper perspective view of the vehicle side body structure, which particularly shows the outer load transmitting member.

Further, as shown in FIG. 7, the outer side portion 153 has an outer lower joining tab 158 formed integrally with the lower edge of the outer side portion 153 for contacting the bottom portion 103, and this outer lower joining tab 158 is welded to the bottom portion 103 of the side sill stiffener 55 via a spot welding portions 154.

Further, as shown in FIG. 6, the outer front partition portion 151 has an outer upper flange portion 161 formed integrally with and projecting perpendicularly from the upper edge of the outer front partition portion 151 for contacting the ceiling portion 101, and this outer upper flange portion 161 is welded to the ceiling portion 101 via a spot welding portion 154. A corner defined by the outer front partition portion 151 and the outer upper flange portion 161 constitutes a first upper ridgeline portion 162, as seen in FIGS. 4 and 5.

The outer front partition portion 151 also has a lower flange portion 163 formed integrally with and projecting perpendicularly from the lower edge of the outer front partition portion 151, so that this lower upper flange portion 163 is welded to the bottom portion 103 of the side sill stiffener 55 via a spot welding portion 154. A corner defined by the outer front partition portion 151 and the lower flange portion 163 constitutes a first lower ridgeline portion 164.

Further, the outer bulkhead 21 has an outer flange portion 165 formed integrally with the inner edge of the outer front partition portion 151 facing toward the passenger compartment 13.

The aforementioned outer rear partition portion 152 is symmetrical in construction and shape with the outer front partition portion 151. In FIGS. 4 and 5, reference numeral 167 represents a second upper ridgeline portion, and 168 represents a second lower ridgeline portion.

The following describe in more detail the inner load transmitting member (inner bulkhead) 22, with reference to FIGS. 2 to 4 and 8 to 10. The inner bulkhead 22 has a substantially U sectional shape, and the inner body portion 75 includes an inner front partition portion 171, an inner rear partition portion 172 and an inner side portion 81.

As viewed in front elevation the vehicle 11 (e.g., FIG. 2), the inner front partition portion 171 and inner rear partition portion 172 are each formed in a substantially rectangular shape that substantially matches the sectional shape of the inner side sill member 54. Further, the inner side portion 81 integrally formed with the inner front partition portion 171 and inner rear partition portion 172 extends along the side wall portion 118 of the inner side sill member 54.

Note that the inner front partition portion 171 and the inner rear partition portion 172 are symmetrical with each other about the centerline C2 of the inner load transmitting member (inner bulkhead) 22.

As viewed in side elevation of the vehicle 11 (e.g., FIG. 8), the inner side portion 81 has a substantially rectangular shape and has an inner boss portion 174 formed centrally thereon to contact the side wall portion 118 of the inner side sill member 54, and the inner boss portion 174 is fixedly joined to the side wall portion 118 via a spot welding portion 267.

Figure 9:
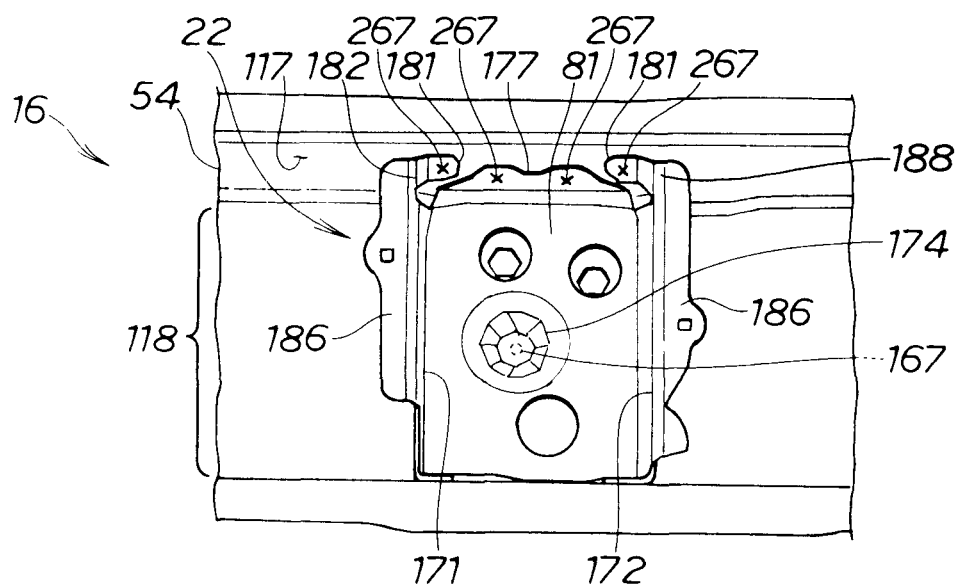
FIG. 9 is a lower perspective view of the vehicle side body structure, which particularly shows an inner load transmitting member provided in the vehicle side body structure.

Further, an inner upper joining tab 177 is formed integrally with the upper edge of the inner side portion 81 of FIG. 9 for contacting the ceiling portion 117 of the inner side sill member 54, and this inner upper joining tab 178 is fixedly joined to the ceiling portion 117 via a spot welding portion 267.

Figure 10:
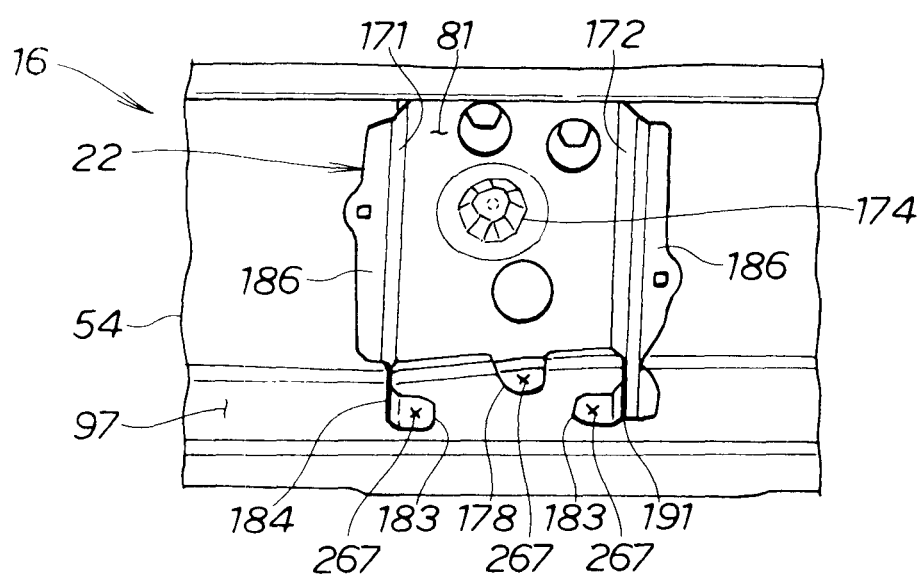
FIG. 10 is an upper perspective view of the vehicle side body structure, which particularly shows the inner load transmitting member.

Further, an inner lower joining tab 178 is formed integrally with the lower edge of the inner side portion 81 of FIG. 10 for contacting the ceiling portion 117 of the inner side sill member 54, and this inner upper joining tab 178 is fixedly joined to the ceiling portion 117 via a spot welding portion 267.

Further, as shown in FIG. 9, the inner front partition portion 171 has an inner upper flange portion 181 formed integrally with the upper edge of the inner front partition portion 171, and this inner upper flange portion 181 is welded to the ceiling portion 117 of the inner side sill member 54 via a spot welding portions 267. A corner defined by the inner front partition portion 171 and the inner upper flange portion 181 constitutes a third upper ridgeline portion 182.

As shown in FIG. 10, the inner front partition portion 171 also has an inner lower flange portion 183 formed integrally with the lower edge of the inner front partition portion 171, and this lower upper flange portion 183 is welded to the bottom portion 97 of the inner side sill member 54 via a spot welding portion 267. A corner defined by the inner front partition portion 171 and the inner lower flange portion 183 constitutes a third lower ridgeline portion 184.

Further, the inner front partition portion 171 has an inner flange portion 186 formed integrally with its outer edge facing outwardly of the vehicle 11, i.e. toward the side sill stiffener 55. As shown in FIGS. 4 and 11, the inner flange portion 186 is opposed to the outer flange portion 165 of the outer bulkhead 21 within the side sill stiffener 55.

The above-mentioned inner rear partition portion 172 is symmetrical with the inner front partition portion 171. In FIGS. 4 and 8, reference numeral 188 represents a fourth upper ridgeline portion, and 191 represents a fourth lower ridgeline portion. As shown in FIGS. 4 and 11, the inner flange portion 186 is located close to the outer flange portion 165 of the outer bulkhead 21 within the side sill stiffener 55.

The above-described embodiment of the vehicle side body structure of the present invention is characterized in that, as viewed in plan of the vehicle 11 (e.g., FIG. 4), the inner body portion 75 (inner front partition portion 171 and inner rear partition portion 172) of the inner bulkhead 22 and the outer body portion 74 (outer front partition portion 151 and outer rear partition portion 152) of the outer bulkhead 21 are disposed in substantially linearly aligned and close relation to each other (see also FIG. 11).

Further, as viewed in plan of the vehicle 11 (e.g., FIG. 4), the third lower ridgeline portion 184 and fourth lower ridgeline portion 191 are disposed in substantially linearly aligned and close relation to the first lower ridgeline portion 164 and second lower ridgeline portion 168, and these ridgeline portions are disposed in substantially linearly aligned and close relation to the front and rear ridgeline portions 91 and 92, respectively, as shown in FIGS. 12 and 13.

The lower-side portion 83 of the inner bulkhead 22 extends from a central position of the inner side portion 81, where the inner boss portion 174 is formed as shown in FIGS. 2 and 12, to the lower edge of the inner side portion 81. As shown in FIG. 12, the lower-side portion 83 is shaped to substantially match the sectional shape (i.e., shape defined by the front wall portion 85, rear wall portion 86 and bottom portion 87) of the cross member 57. The inner front partition portion 171 of the inner bulkhead 22 is positioned to substantially match the extension of the front wall portion 85, and the inner rear partition portion 172 of the inner bulkhead 22 is positioned to substantially match the extension of the rear wall portion 86. Namely, the inner load transmitting member (inner bulkhead) 22 is disposed along the end surface of the one end portion 59 of the cross member 57.

Next, a description will be given about behavior of the embodiment of the vehicle side body structure of the present invention.

Figure 16A:
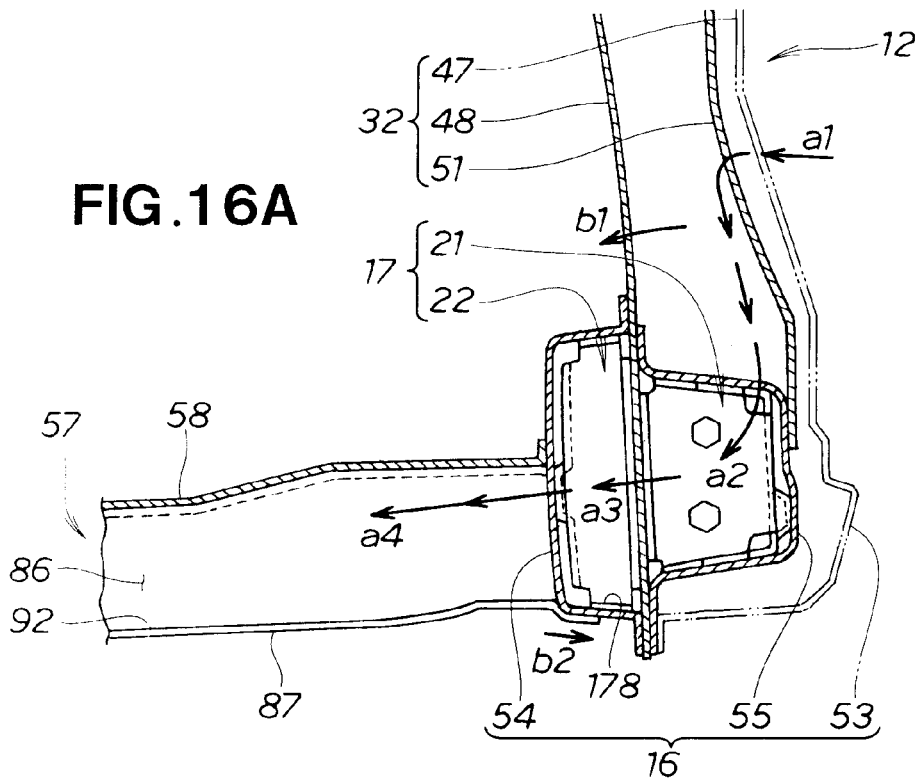
FIG. 16A is a front view, corresponding to FIG. 1, explanatory of a mechanism provided in the embodiment of the vehicle side body structure for transmitting a lateral collision load to a floor of the vehicle.
Figure 16B:
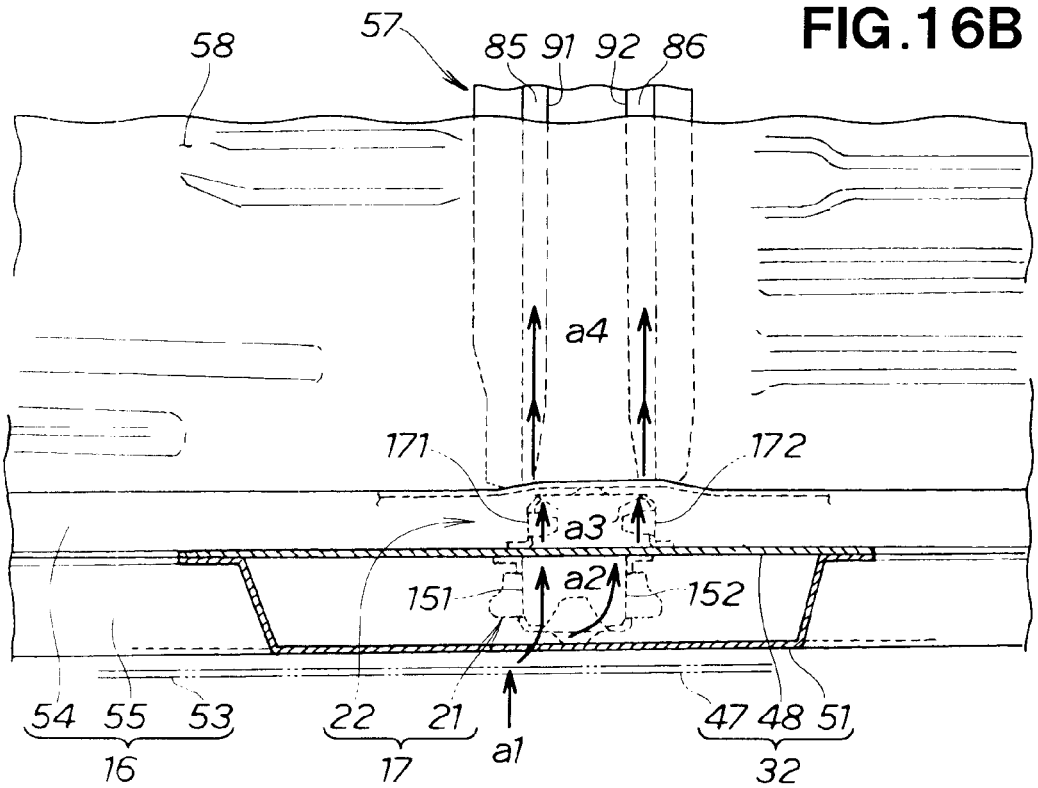
FIG. 16B is a plan view, corresponding to FIG. 3, explanatory of the mechanism.

Once a lateral collision impact (load) is input to the side surface 12 of the vehicle 11 as indicated by arrow a1 in FIG. 16, the lateral collision load is transmitted, in the vehicle side body structure, from the center pillar 32 to the outer load transmitting member (outer bulkhead) 21 within the outer space 65 of the side sill 16 as indicated by arrow a2.

Then, the collision load is transmitted from the outer bulkhead 21 to the inner load transmitting member (inner bulkhead) 22 as indicated by arrow a3, so that it is transmitted from the inner load transmitting member 22 to the cross member 57 as indicated by arrow a4. Thus, the lateral collision load can be transmitted from the side surface 12 of the vehicle 11 to the cross member 57 that constitutes a framework of the under body 14.

Further, as viewed in plan of the vehicle 11, the inner front partition portion 171 of the inner bulkhead 22 and the outer front partition portion 151 of the outer bulkhead 21 are positioned in substantially linearly aligned relation to the front wall portion 85 of the cross member 57, while the inner rear partition portion 172 of the inner bulkhead 22 and the outer rear partition portion 152 of the outer bulkhead 21 are positioned in substantially linearly aligned relation to the rear wall portion 86 of the cross member 57.

Further, as viewed in plan of the vehicle 11, the third upper ridgeline portion 182 and third lower ridgeline portion 184 of the inner bulkhead 22 and the first upper ridgeline portion 162 and first lower ridgeline portion 164 of the outer bulkhead 21 are positioned in substantially linearly aligned relation to the front ridgeline portion 91 of the cross member 57. Furthermore, the fourth upper ridgeline portion 188 and fourth lower ridgeline portion 191 of the inner bulkhead 22 and the second upper ridgeline portion 167 and second lower ridgeline portion 168 of the outer bulkhead 21 are positioned in substantially linearly aligned relation to the rear ridgeline portion 92 of the cross member 57.

Thus, in the embodiment of the vehicle side body structure of the present invention, a lateral collision impact (load) is transmitted from the outer load transmitting member (outer bulkhead) 21 to the inner load transmitting member (inner bulkhead) 22 substantially linearly and then transmitted from the inner bulkhead 22 to the cross member 57 substantially linearly. As a result, the embodiment of the vehicle side body structure can advantageously transmit the lateral collision load to the cross member 57 that constitutes the framework of the under body 14.

Further, in the embodiment of the vehicle side body structure, as shown in FIG. 16A, once a lateral collision impact (load) is input to the side surface 12 of the vehicle 11 as indicated by arrow a1 in FIG. 16A, a bending moment would be produced and transmitted in the side sill 16 so that the side sill 16 starts twisting at indicated by arrow b1, and the collision load is transmitted from the outer load transmitting member (outer bulkhead) 21 to the inner load transmitting member (inner bulkhead) 22.

After that, the collision load is transmitted as a tensile load from the lower end (inner lower joining margin 178) of the inner bulkhead 22, greater in vertical dimension than the outer bulkhead 21, to the bottom portion 87 of the cross member 57 almost linearly as indicated by arrow b2, and thus, force that would twist the side sill 16 can be reduced.

Furthermore, in the embodiment of the vehicle side body structure, as shown FIGS. 4 and 11, the load transmitting member unit 17 is provided in such a manner that the outer flange portions 165 of the outer load transmitting member (outer bulkhead) 21 and the inner flange portions 186 of the inner load transmitting member (inner bulkhead) 22 overlap each other in the front-rear direction of the vehicle.

Because the inner flange portion 186 and outer flange portion 165 of the outer front partition portion 151 overlap each other while the inner flange portion 186 and outer flange portion 165 of the outer rear partition portion 152 are positioned close to each other, a lateral collision load can be reliably transmitted from the outer bulkhead 21 to the inner bulkhead 22, more specifically, via the center pillar's passed-through section 67.

Next, a description will be given about other principal elements of the embodiment of the vehicle side body structure, with reference to FIGS. 17 to 20.

Figure 17:
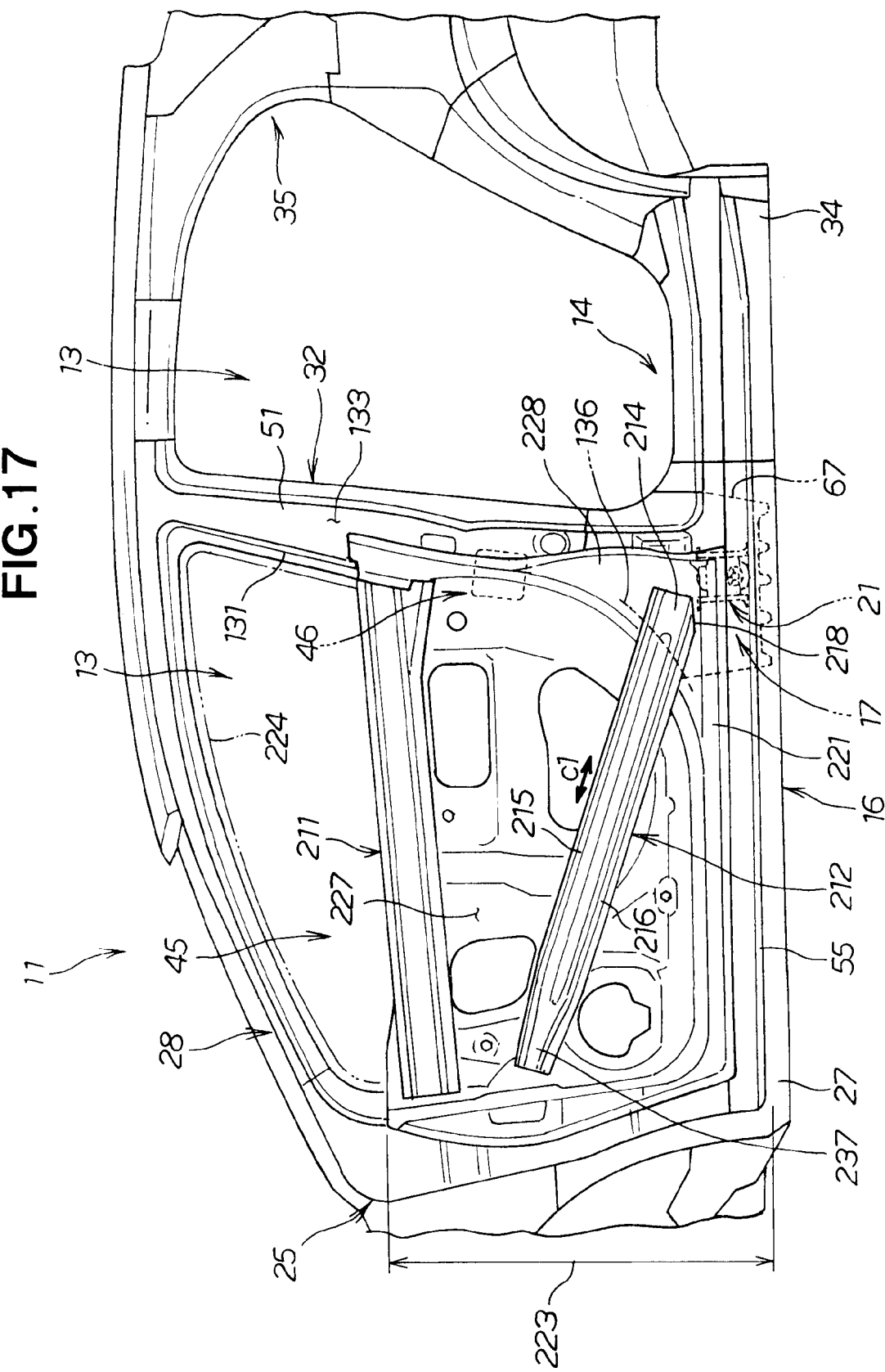
FIG. 17 is a side view of a vehicle body and door employing the embodiment of the vehicle side body structure.

FIG. 17 is a partly-see-through side view of the vehicle body and door employing the embodiment of the vehicle side body structure, which particularly shows relationship between the side sill stiffener 55 and the outer load transmitting member (outer bulkhead) 21 provided within the side sill stiffener 55.

The front door 45 has first and second door beams 211 and 212. A rear end portion 214 of the second door beam 212 disposed within the front door 45 is located close to the outer load transmitting member (outer bulkhead) 21.

The second door beam 212 has first and second beads 215 and 216 extending in a longitudinal direction thereof (direction of arrow c1 in FIG. 17). As viewed in side elevation of the vehicle 11 (e.g., FIGS. 17 and 18), the rear end portion 214 of the second door beam 212 is lapped over the corner portion (first center pillar stiffener ridgeline portion 136) of the center pillar's intermediate layer member (center pillar stiffener 51) having a channel-like sectional shape (more specifically, hat-like sectional shape) (see FIGS. 3 and 15). The second door beam 212 also has a chamfered (i.e., corner-cut-off) portion 218 formed in the rear end portion 214 along the lower end edge 221 of the door 45.

The outer load transmitting member (outer bulkhead) 21 and the inner load transmitting member (inner bulkhead) 22 are substantially linearly aligned in the longitudinal direction of the cross member 57, as seen in FIGS. 3 and 4.

The following describe in greater detail the other principal elements of the embodiment of the vehicle side body structure. As shown in FIGS. 2 and 17 to 20, the front door 45 includes a door body 223 and a door sash 224 extending continuously upward from the door body 223. The door body 223 includes an outer door panel 226 constituting the outer surface of the front door 45 (FIG. 2), and an inner door panel 227 fixedly joined to the outer door panel 226.

Further, the front door 45 includes an edge joint section 228 that fixedly join together respective edges of the inner door panel 227 and outer door panel 226. The first door beam 211 is disposed substantially horizontally over a space portion 231 defined between the inner door panel 227 and outer door panel 226, and the second door beam 212 is disposed obliquely.

The second door beam 212 is plastically formed of a belt-shaped plate, and, as viewed in side elevation of the vehicle 11 (e.g., FIGS. 17 and 18), the first and second beads 215 and 216 are plastically formed on the second door beam 212 in parallel to the longitudinal axis line Cp of the beam 212. The second door beam 212 also has a lower flange 234 and an upper flange 233 oriented upwardly of the vehicle 11.

The first bead 215 has a V sectional shape. More specifically, the first bead 215 is formed in a V shape as viewed at right angles to the axis line. The first bead 215 has an upper ridgeline portion 236 extending from the distal end edge of a front end portion 237 to the distal end edge of the rear end portion 214 of the second door beam 212.

The first bead 215 has a small depth in the front end portion 237 and rear end portion 214, and an intermediate portion of the first bead 215 between than the front end portion 237 and rear end portion 214 has a greater depth than the front end portion 237 and rear end portion 214.

The second bead 216 is constructed similarly to the first bead 215 and has a lower ridgeline portion 241 formed similarly to the upper ridgeline portion 236. The upper ridgeline portion 236 and the lower ridgeline portion 241 approach each other in the front end portion 237, but are spaced apart, in a region from the front end of the intermediate portion to the rear end portion 214, by a greater distance than in the front end portion 237.

The front end portion 237 of the second door beam 212 is fixedly joined to a middle portion, in the vehicle height direction, of a front section of the door body 223, while the rear end portion 214 is fixedly joined to a lower portion, in the vehicle height direction, of a rear section of the door body 223.

More specifically, as viewed in side elevation of the vehicle 11 (e.g., FIG. 18), the rear end portion 214 is positioned to overlap and straddle the first and second outer center pillar ridgeline portions 141 and 142 and the first and second center pillar stiffener ridgeline portions 136 and 137.

Further, as viewed in side elevation of the vehicle 11 (e.g., FIGS. 17 and 18), the rear end portion 214 is located close to the outer load transmitting member (outer bulkhead) 21 of the load transmitting unit 17. In addition, the chamfered portion 218 is formed in the lower flange 234 along the lower end edge 221 of the door body 223.

Figure 18:
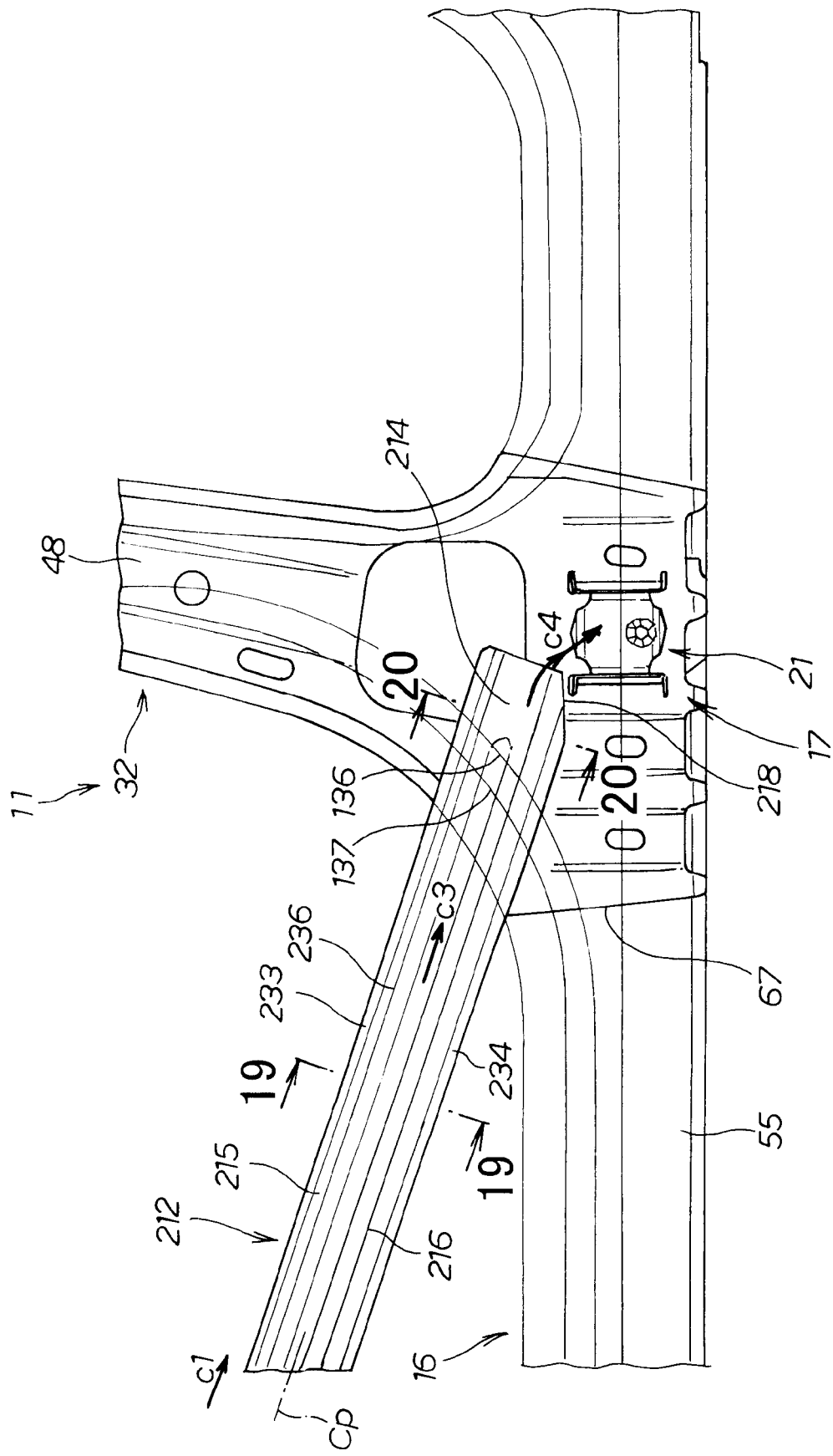
FIG. 18 is a partly-see-through perspective view of the embodiment of the vehicle side body structure.
Figure 19:
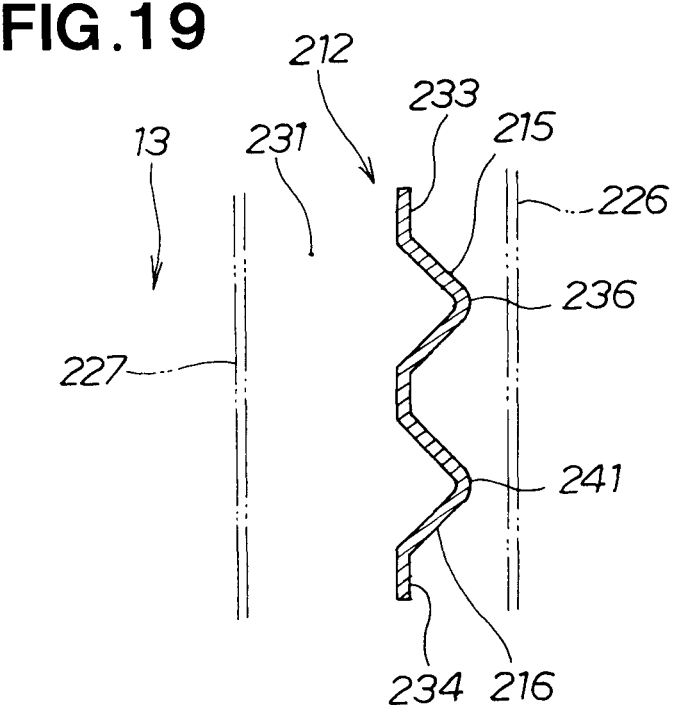
FIG. 19 is a sectional view taken along line 19-19 of FIG. 18.
Figure 20:
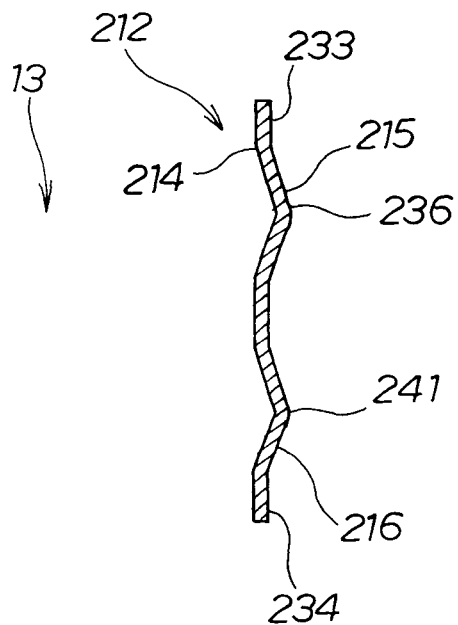
FIG. 20 is a sectional view taken along line 20-20 of FIG. 18.

Once a lateral collision impact (load) is input to the side surface 12 of the vehicle 11 in a direction substantially perpendicular to the surface of FIG. 18, the input load is transmitted to the second door beam 212 as indicated by arrow c3 in FIG. 18. Then, the load is transmitted from the second door beam 212 to the outer load transmitting member (outer bulkhead) 21 as indicated by arrow c4 in FIG. 18.

Thus, the lateral collision load is transmitted from the second door beam 212 to the outer load transmitting member (outer bulkhead) 21 and inner load transmitting member (inner bulkhead) 22 of the load transmitting unit 17.

The first bead 215 and second bead 216 approach each other in the front end portion 237, but are spaced apart, in the region from the front end of the intermediate portion to the rear end portion 214, by a greater distance than in the front end portion 237.

Further, as viewed in side elevation of the vehicle 11, the spaced-apart first and second beads 215 and 216 are positioned to overlap and straddle the first and second outer center pillar ridgeline portions 141 and 142 and the first and second center pillar stiffener ridgeline portions 136 and 137. In this way, the lateral collision impact (load) input to the second door beam 212 can be dispersed via the first and second ridge portions 141, 142, 136, 137.

Namely, because the lateral collision impact (load) input to the second door beam 212 is transmitted to the vehicle body 24 via the first and second beads 215 and 216, it is possible to prevent the second door beam 212 from being bent due to the lateral collision.

The vehicle side body structure of the present invention is well suited for application to vehicles where a center pillar of a side wall and cross member of a floor are fixedly joined to a substantial longitudinally-middle portion of a side sill.

What is claimed is:

1. A vehicle side body structure including a side sill of a closed sectional shape constituting a lower end of a left or right side wall of a passenger compartment with a door mounted thereon, a cross member of a floor of the passenger compartment being mounted at one end portion thereof to a substantial longitudinally-middle portion of the side sill, said vehicle side body structure comprising:

a center pillar extending upward from the longitudinally-middle portion of the side sill and including an inner center pillar member, the inner center pillar member having a passed-through section passed through an interior of the side sill to partition the interior into an inner space and an outer space;

an outer load transmitting member disposed within the outer space in opposed relation to the passed-through section of the inner center pillar member; and an inner load transmitting member disposed within the inner space in opposed relation to the outer load transmitting member with the passed-through section of the inner center pillar member interposed therebetween;

wherein, as viewed in front elevation of the vehicle, the inner load transmitting member is located higher than the outer load transmitting member in a height direction of the vehicle and is lapped over a lower portion of the center pillar extending upward above the outer load transmitting member.

2. The vehicle side body structure according to claim 1, wherein the inner load transmitting member is disposed along an end surface of the one end portion of the cross member.

3. The vehicle side body structure according to claim 1, wherein the outer load transmitting member is fixedly joined to an intermediate-layer member of the side sill defining the outer space in conjunction with the passed-through section of the inner center pillar member, and the inner load transmitting member is fixedly joined to an inner side sill member defining the inner space in conjunction with the passed-through section of the inner center pillar member.

4. The vehicle side body structure according to claim 1, wherein, as viewed in plan of the vehicle, the inner and outer load transmitting members each have a hat-like sectional shape and have respective openings opposed to each other, the inner and outer load transmitting members have respective body portions extending in a width direction of the vehicle substantially perpendicularly to the passed-through section of the inner center pillar member, the respective body portions of the inner and outer load transmitting members being aligned with each other substantially linearly in the width direction of the vehicle.

5. The vehicle side body structure according to claim 1, wherein the inner load transmitting member includes an inner side portion facing toward the cross member, the inner side portion having upper-side and lower-side portions one of which is positioned and shaped to substantially match a sectional shape of the cross member, and wherein the inner load transmitting member has a body portion extending continuously from the inner side portion at substantial right angles thereto, the body portion of the inner load transmitting member being aligned substantially linearly with front and rear wall portions of the cross member facing forward and rearward, respectively, of the vehicle.

6. The vehicle side body structure according to claim 1, wherein a door beam disposed within the door has a rear end portion located close to the outer load transmitting member.

7. The vehicle side body structure according to claim 6, wherein the door beam has a bead provided thereon and extending in a longitudinal direction thereof, and, as viewed in side elevation of the vehicle, the rear end portion of the door beam is lapped over a corner portion of a channel-shaped intermediate layer member of the center pillar.

8. The vehicle side body structure according to claim 6, wherein the door beam has a chamfered portion formed in the rear end portion along a lower end edge of the door.

9. The vehicle side body structure according to claim 1, wherein the outer load transmitting member and the inner load transmitting member are substantially linearly aligned in a longitudinal direction of the cross member.

* * * * *